United States Patent [19]

Markwitz

[11] 3,761,891

[45] Sept. 25, 1973

[54] CIRCUIT ARRANGEMENT FOR SYNCHRONIZING TRANSMITTERS AND RECEIVERS IN DATA TRANSMISSION SYSTEMS

[75] Inventor: Wernhard Markwitz, Munich, Germany

[73] Assignee: Siemens Aktiengesellschaft, Berlin and Munich, Germany

[22] Filed: Mar. 17, 1972

[21] Appl. No.: 235,680

[30] Foreign Application Priority Data

Mar. 18, 1971 Germany.................. P 21 13 018.7

[52] U.S. Cl. .......................................... 340/146.1 D

[51] Int. Cl. ................................................ H04l 7/00

[58] Field of Search................ 340/146.1 D; 179/15; 178/69.5

[56] References Cited

UNITED STATES PATENTS

| | | | |
|---|---|---|---|
| 3,491,338 | 1/1970 | Malloy | 348/146.1 D |
| 3,571,794 | 3/1971 | Tong | 340/146.1 D |
| 3,587,043 | 6/1971 | Mengani | 340/146.1 D |

*Primary Examiner*—Charles E. Atkinson
*Attorney*—William E. Schuyler, Jr. et al.

[57] ABSTRACT

A circuit arrangement for synchronizing transmitters and receivers in data transmission systems to facilitate the transfer of blocks of data constituted by information bits and parity bits is described. In the receiver the bits are serially entered into a shift register. A testing circuit is provided which, after supplying a testing clock signal, emits an output signal when the bits in the shift register pertain to the same data block. Testing circuits may be individually connected to stages in the shift register, and the testing signals are generated responsive to the presence of information or parity bits in the various register stages. Clock generators are provided for producing data block clock signals with as many block clock signals being produced as there are possible positions in the data blocks. The block clock signals are supplied to the testing circuits as testing clock signals via outputs of the clock generators. The testing circuit outputs are connected to counter inputs, and the counter outputs are connected to a logic circuit. The logic circuit determines the correct block clock signal in relation to the counter output signal.

6 Claims, 7 Drawing Figures

CIRCUIT ARRANGEMENT FOR SYNCHRONIZING TRANSMITTERS AND RECEIVERS IN DATA TRANSMISSION SYSTEMS

BACKGROUND OF THE INVENTION

This invention relates to a circuit arrangement for synchronizing transmitters and receivers when communicating blocks of data containiung information bits and parity bits, from one to the other, whereby these bits in the receiver in the measure of step pulses are entered serially into a shift register. A testing circuit is provided therein which, after supplying a testing clock signal, transmits a testing signal when the bits stored in the shift register belong to one and the same data block.

as is known, when data blocks are transmitted, the individual bits of these data blocks are sent in succession. On the receiving end, the correct data blocks must be allocated to the individual serially-transferred bits and the correct block position must be found. When a group of bits are registered, whose bits are from two different sequential data blocks, false characters are allocated to this group of bits.

According to a conventional data transmission procedure, in addition to the information bits, synchronization bits are transferred, by means of which the receiver can recognize the beginning and end of the data blocks and the correct block position. This conventional method, however, has the disadvantage that because of the synchronization bits being transferred, the amount of data which can be communicated is reduced.

It is an object of the invention to provide a means which, while avoiding the foregoing disadvantages of the conventional method, can find the correct block position as rapidly as possible and can maintain the same, even when the data blocks are disturbed.

SUMMARY OF THE INVENTION

In a circuit arrangement of the type mentioned hereinabove, testing circuits, in accordance with the invention, are connected to individual cells of a shift register, and the testing signals are generated as a function of the presence of information bits and parity bits. In addition, in clock generators as many block clock signals are generated as different block positions of the data blocks are possible. During this process, the block clock signals are supplied as testing clock signals to the testing circuits via the outputs of the clock generators, and the outputs of the testing circuits are connected to the inputs of counters. The outputs of the counters are connected to a logic circuit which discovers the right block clock signal in response to the output signals of the counters.

The circuit arrangement in accordance with the invention has the advantage that the correct block position is very rapidly found and is maintained even during serious disturbances. This is particularly imporatant when convolutional self-correcting codes are employed.

The invention is also novel in that no synchronization bits, but only information bits and parity bits, must be transferred. During this process, the parity bits, at the transmitter, are discovered in response to the information bits, and on the receiving end these parity bits are not only used for error detection and correction, but also for finding the right block position.

When the correct block position should be found very rapidly, it is useful to provide as many testing circuits as different block positions of the data blocks are possible. Each block clock signal is then supplied to one of the testing circuits, and the outputs of these testing circuits are connected to each counter. Each second output of these testing circuits is connected to the resetting inputs of the counters.

To avoid the operation of all counters during long sequences of the same bits, it is useful to supply the received data to the shift register via a bistable sweep stage and to connect each input and output of this bistable sweep stage to a binary adder. This binary adder transmits a signal which identifies the same sequential data and by which an additional counter can be controlled which, when a predetermined register indication is reached, causes the resetting of the counters connected to the testing circuit. The maximum register indication of this additional counter should be lower than the maximum register indication of the counters connected to the testing circuits.

BRIEF DESCRIPTION OF THE DRAWINGS

The principles of the invention will be best understood by reference to a description, given hereinbelow, of preferred embodiments, constructed according to these principles, in conjunction with the drawings described briefly below.

DETAILED DESCRIPTION OF THE DRAWINGS

Figure 1:
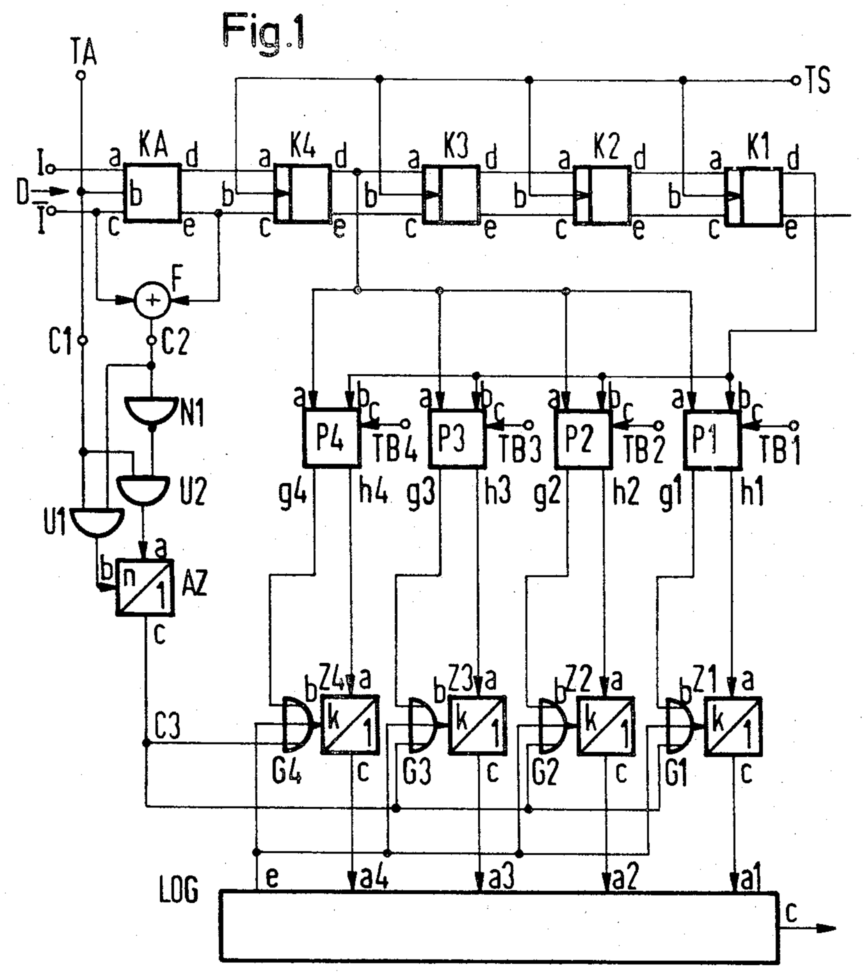
FIG. 1 is a schematic diagram of a circuit arrangement, according to the invention, for receiving data blocks.

In FIG. 1 are shown various switching stages K1, K2, K3, K4 and KA which jointly form a shift register. These switching stages can assume two stable states, one being designated 0-state and the other 1-state. These switching stages have inputs *a*, *b*, *c* and outputs *d*, *e*. In the course of the duration of the 0-state there is a 0-signal at output *d* and a 1-signal at output *e*. In the course of the duration of the 1-state there is a 1-signal at output *d* and a 0-signal at output *e*. The switching stages are transferred from their 0-state into their 1-state, when a transition takes place at input *b* from a 1-signal to a 0-signal and when $a=1$ and $c=0$. The switching stages are transferred from their 1-state into their 0-state when at input *b* there also occurs a transition from a 1-signal to a 0-signal and when $a=0$ and $c=1$. When 1-signals are coupled to inputs *a* and *c*, the switching stages are alternately transferred into each of the other two stable states 0 or 1 with each transition at input *b* from a 1-signal to a 0-signal. The individual bits of a received message D are supplied to input *a* or *c* of switching stage KA. For clear identification, in this embodiment, it is assumed that the data blocks consist only of four bits each, to which switching stages K1, K2, K3 and K4 are, respectively, allocated. As a particular matter, a considerably larger number of such switching stages are provided.

The construction of the shift register, described above, can obviously take other forms, which can be used advantageously in this invention.

A testing circuit P1 to P4 is, respectively, allocated to each of the switching stages K1 to K4. Input a of each of the testing circuits P1 to P4 is connected to output K4*d*, whereas each input *b* is connected to output K1d. It is assumed that the first and last bit of the data blocks are redundancy bits which also serve for the synchronization, whereas the second and the third bits of the data blocks are information bits. The correct block position is attained when bit A1=0 and bit A4=1. The testing circuits P1, P2, P3 and P4 verify at different points of time the bits stored in switching stages K1 and K4 and transmit a 1-signal via lines *h*1, *h*2, *h*3, *h*4, when in switching stage K1 a 0-value is stored and in switching stage K4 a 1-value. When other binary values are stored in switching stages K1 and K4, switching stages P1 to P4 transmit signals via lines *g*1 to *g*4, which indicate a false block position. The testing circuits will be described in greater detail hereinbelow.

Block clock signals TB1, TB2, TB3, TB4 are supplied to testing circuits P1 to P4 via inputs *c*. These are used to determine the point of time at which the verification is effected. The inputs d of testing circuits P1 to P4 are connected to the outputs of the logic circuit LOG.

Half adder F transmits a 0-signal, when 1-signals or 0-signals appear at both of its inputs, and it transmits a 1-signal when a 1-signal appears at one of the inputs.

Gates U1 and U2 are AND gates which only transmit a 1-signal when 1-signals appear at all their inputs. Gate N1 is an inverter which reverses the polarity of the signals supplied at the circuit input. Gates G1, G2, G3, G4 are OR gates which only transmit a 0-signal when 0-signals are coupled to all inputs.

Counter AZ advances by one unit, when it receives a 1-signal via input *a*. When counter AZ receives a 1-signal via input *b*, it is reset to zero. When a maximum indication *n* is reached, the counter transmits a 1-signal via output *c*.

Counters Z1, Z2, Z3 and Z4 advance by one unit upon receiving a 1-signal via their inputs *a*. With a 1-signal at input *b*, the registrations of these counters are reset to zero. Should a counter reach a maximum indication K, it transmits a 1-signal to logic circuit LOG via output *c*. The logic circuit will be described in greater detail hereinbelow.

By utilizing logic circuit LOG, the block clock signal is selected which is allocated to the correct block position.

Figure 2:
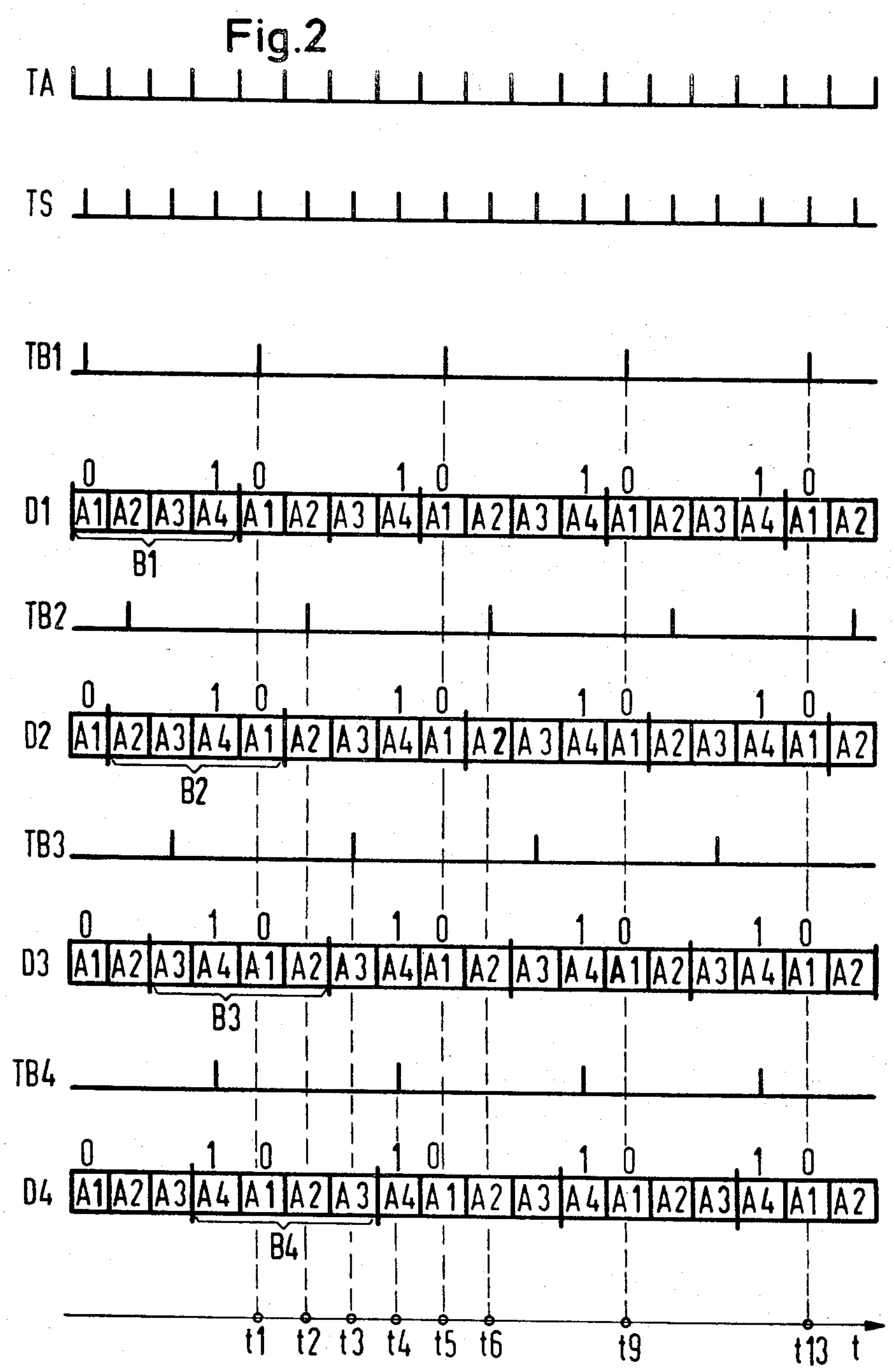
FIG. 2 illustrates diagrams through which the mode of operation of the circuit arrangement, shown in FIG. 1, is explained.

FIG. 2 shows pulse diagrams and signal representations which represent the operating characteristics of the invention. Units of time *t* are plotted in the direction of abscissa. Clock signals TA, TS, TB1, TB2, TB3, TB4 are conventionally generated in pulse generators (not shown herein). Clock pulses TA and TS have the same pulse frequency rate as the individual bits of the received message. The pulse of clock signals TA and TS are transmitted with a phase difference of 180° relative to each other.

In addition to these clock signals, data D1, D2, D3, D4 are diagrammatically shown which are supplied via terminals I or Ī (FIG. 1). These data consist of individual data blocks, each of which contains four bits A1, A2, A3, and A4. The first bit A1=0 and the fourth bit A4=1 serve as synchronization bits.

The second bits A2 and the third bit A3 are information bits. Since each data block consists exactly of four bits, four block positions are possible. Data D1, D2, D3 or D4 have the block position B1=A1, A2, A3, A4 or B2=A2, A3, A4, A1 or B3=A3, A4, A1, A2 or B4=A4, A1, A2, A3. Block position B1 is the correct block position, whereas block positions B2, B3 and B4 are false block positions. The circuit arrangement shown in FIG. 1 has the function of discovering the correct block position B1 and the block clock signal T1 pertaining thereto so as to synchronize receiver circuits.

Data D are serially supplied via terminals I or Ī and stored in switching stages KA and K4, K3, K2, and K1 in the cycle of clock signals TA and TS. It is assumed that at instant t1 the bits A1 or A2 or A3 or A4 are stored in switching stages K1 or K2 or K3 or K4. At instant t1, a pulse of the block clock signal TB1 is supplied to the testing circuit P1 via input *c*, and thus, the testing circuit P1 is caused to execute a block testing operation. Since in this case the bits are A1=0 and A4=1, a 1-signal is transmitted via line *h*1 which signals the correct block circuit B1 and causes counter Z1 to advance by one unit.

At instant *t*2, the testing circuit P2 is caused to execute a block test with a pulse of the blok frequency. At this instant, bits A2 or A3 or A4 or A1 are stored in switching stages K1 or K2 or K3 or K4. Since bit A1=0 is stored in switching stage K4, testing circuit P2 recognizes that block circuit B2 is not correct and transmits a 1-signal via line *g*2 which causes the resetting of counter Z2 via gate G2.

At instants *t*3 or *t*4, each one of the pulses of block clock signal TB3 or TB4 is supplied to testing circuits P3 or P4, which then execute a block test at these instants T3 or *t*4. Since at instant *t*3, probably, switching stage K4 does not contain a 1 and, probably a 0 is not stored in switching stage K1, and since at instant *t*4 a 0 is not stored in switching stage K1, the resetting of counters Z3 or Z4 is caused via line *g*3 and via gate G3 or via line *g*4 and via gate G4.

Testing circuit P1 verifies the block position at instant *t*5, and since we are concerned with the correct block position, it transmits a pulse via line *h*1, which advances the registration of counter Z1 again by one unit. In like manner, the block position is verified at instants *t*9 and *t*13, by means of testing circuit P1, and the registration of counter Z1 is advanced by one unit. After *k* pulses have been supplied via input Z1*a*, a pulse is transmitted to inout a1 of logic circuit LOG via output Z1c, i.e., block clock signal TB1 identifies the correct block position (B1), so that block clock signal TB1 is transmitted to logic circuit LOG via output *c*. By utilizing this block clock signal TB1, circuit arrangements not shown herein are synchronized, which process the data blockwise. For example, with this block clock signal TB1 the parallel output of the bits stored in switching stages K1, K2, K3, K4 can occur in a printer (not shown herein).

If bits A3 or A2 of data D3 in block position B3 happen to have binary values 0 or 1, then at instant *t*3 a 1-signal is transmitted by testing circuit P3 to counter Z3 via line $h3$, thus, signalling a correct block position. Such individual false testing results have no effect, because the counters are reset prior to the arrival of the $k$th counting pulse, which will be discussed in detail hereinbelow.

Such a resetting is always caused by the logic circuit LOG, when a signal has arrived via one of inputs $a1$, $a2$, $a3$, $a4$, which has signalled a correct block position. Under the special assumptions indicated hereinabove, a signal has been transmitted by counter Z1 to input a1 of logic circuit LOG, and the resetting of counters Z2, Z3, Z4, is cuased with this signal. Individual counting pulses supplied via lines $h2$, $h3$, $h4$, thus, have no effect in locating the correct block position.

It would be conceivable that in special data sequences all testing circuits P1 to P4 repeatedly transmit counting pulses via lines $h1$ to $h4$, so that, also, counters Z1 to Z4 transmit signals to the corresponding inputs $a1$ to $a4$ of logic circuit LOG, so that this logic circuit is overcharged. To prevent a correctly located block position from getting lost, counters Z2, Z3, Z4 are always reset, when fairly long time sequences of the same data occur. This resetting of the counters is caused by using switching stage KA, half adder F, gates U1, U2, N1, and by using counter ZA.

When a sequence of bits having the same binary values is supplied via inputs, I, $\bar{I}$, throughout a fairly long period, 0-signals are constantly transmitted via output C2 of adder F, and these disable gate U1, while enabling the opening of gate U2, because of gate N1. Thus, with the entry of clock signal TA a 1-signal is transmitted as a counting pulse from the output of gate U2 to counter ZA.

Counter ZA transmits, after three counting pulses, a signal via output c which is supplied to counters Z1, Z2, Z3, Z4, via gates G1, G2, G3, G4, and which causes the resetting of these counters.

In case the bits supplied via terminals I and $\bar{I}$ alternately assume different binary values 0 or 1, adder F transmits a 1-signal which opens gate U1 in combination with a pulse of clock signal T so that counter AZ receives a signal via input $a$ which resets the counter position.

Hence, from output $c$ of counter AZ, an output signal can only be expected when throughout a fairly long period bits having the same binary values are supplied via terminals I and $\bar{I}$.

The maximum registration $n$ of counter AZ is smaller than the maximum registration $k$ of counters Z1, Z2, Z3, Z4, because these counters Z1 to Z4 shall be reset, when the correct block position has already been found, before they have reached their maximum registration.

Figure 3:
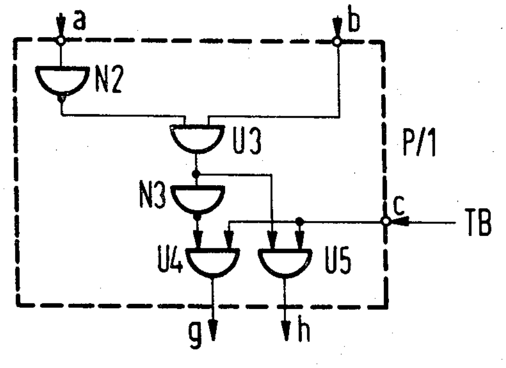
FIG. 3 is a schematic diagram of a simple testing circuit which can be utilized in the circuit shown in FIG. 1.

FIG. 3 shows a simply constructed testing circuit P/1 which could be utilized as testing circuit P1, P2, P3 or P4. This testing circuit P/1 comprises AND gates U3, U4, U5, and NOT gates N2, N3. Input a is connected to output K4$d$ and input $b$ to output K1$d$. Block clock signal TB is supplied via input $c$. By means of this testing circuit P/1, it is determined whether a 0-signal appears at output K1d and a 1-signal appears at output K4$d$. If this is so, a 1-signal is transmitted to AND gate U5 from the output of AND gate U3, and a 1-signal is transmitted with the next pulse of block clock signal TB via line $h$ which signals the correct block position.

If no correct block position has been found, a 0-signal is transmitted from the output of AND gate U3, from the output of NOT gate N3, a 1-signal is transmitted, and with a 1-signal which is supplied via input $c$ a 1-signal is transmitted from the output of AND element U4 via line $g$, which causes the resetting of the counter connected to testing circuit P/1.

For reasons of simplicity it was assumed in the description of FIGS. 1 and 3 that bits A1 and A4 are synchronization bits having constant values A1=0 and A4=1. The useful portion of the transmitted message is reduced by these synchronization bits.

It is, therefore, more advantageous to transfer bits A1 and A4 as parity bits. In this case, the values of these parity bits are determined at the transmitter in response to the values of information bits A2 and A3. At the receiver, the parity bits can then be utilized, not only to detect errors and correct the same, but also to discover the correct block position.

Figure 4:
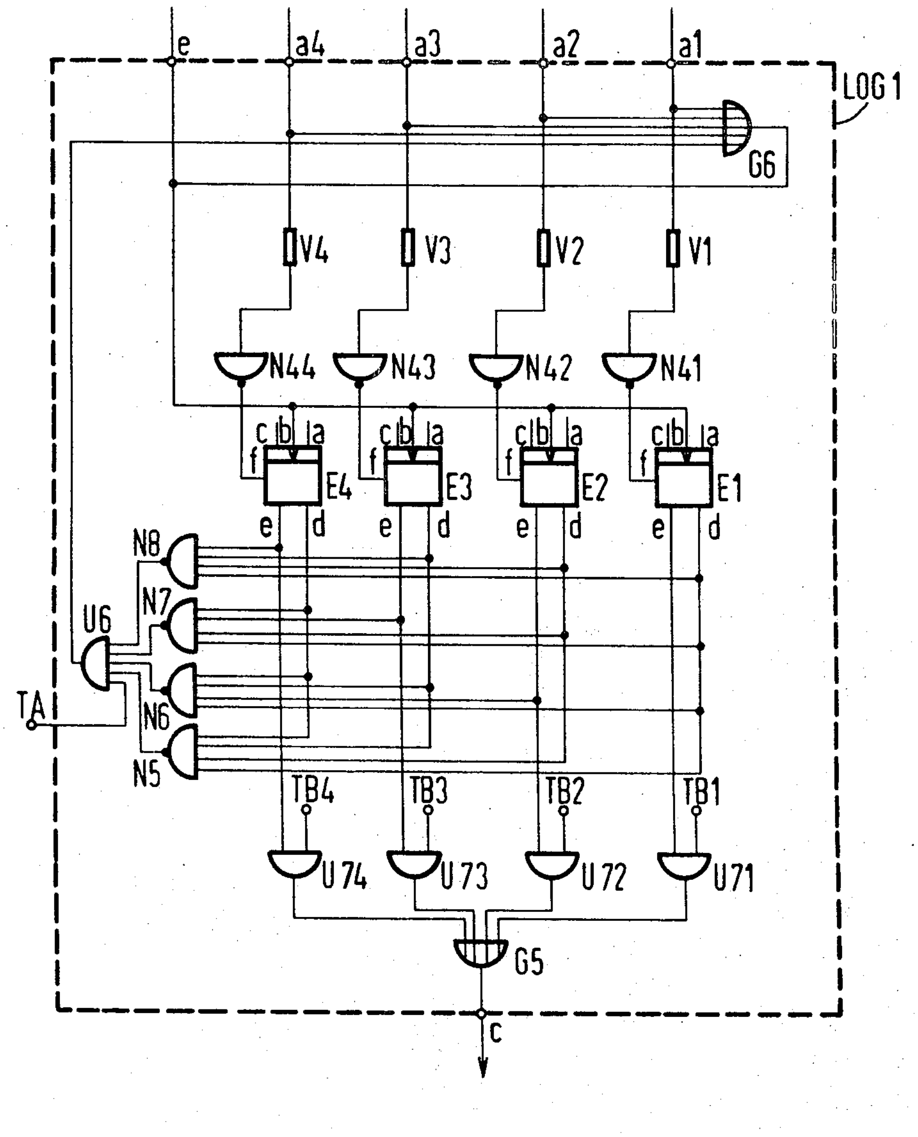
FIGS. 4 and 5 are schematic diagrams of logic circuits which can be utilized in the circuit arrangement illustrated in FIG. 1.

FIG. 4 shows logic circuit LOG1 which could be utilized for the logic circuit LOG shown diagrammatically in FIG. 1. This logic circuit LOG1 comprises delay elements V1, V2, V3, V4, NOT gates N41, N42, N43, N44, bistable switching stages E1, E2, E3, E4, NAND gates N5, N6, N7, N8, AND gates U6, U71, U72, U73, U74, and OR gates G5, G6. Each of the aforementioned elements is of known construction and need not be described further herein.

Bistable switching stages E1 to E4 assume their 0-stage, when they transmit a 0-signal via output d and a 1-signal via output $e$. They assume their 1-state when they transmit a 1-signal via output $d$ and a 0-signal via output $e$. A 1-signal appears continually at input $a$, and a 0-signal appears continually at input $c$. The transition from the 0-state to the 1-state takes place when a 1-signal appears at input $f$ and when, at input $f$ a change takes place from a 1-value to a 0-value. Switching stages E1 to E4 are switched from their 1-state to the 0-state, when a 0-signal is supplied via their input $f$. Inputs $c$ of counters Z1 to Z4, shown in FIG. 1, are connected to inputs $a1$ to $a4$ shown in FIG. 4.

To explain the mode of operation of the circuit arrangement shown in FIG. 4, it is assumed, for example, that a 1-signal of counter Z1 comes in via input $a1$. This 1-signal causes the resetting of all counters Z1 to Z4 via gate G6 and via output $e$. The 1-signal supplied via input $a1$ is supplied with a certain delay to the NOT gate, so that a 0-signal appears at input $f$ of switching stage E1. Thus, this switching stage E1 is transferred from its 1-state to its 0-state and transmits a 1-signal to AND gate U71 via output $e$. As long as this switching stage E1 assumes its 0-state, block clock signal TB1 is transmitted via AND gate U71 and via gate G5 and output c as the block clock signal which is allocated to the correct block position. This state lasts as long as only the allocated counter Z1 transmits signals to inputs a1 of logic circuit LOG1 and the other counters Z2, Z3, Z4 transmit 0-signals.

When, instead of counter Z1, e.g., counter Z3, transmits a 1-signal to logic circuit LOG1 via input $a3$, this signal is supplied to gates G1 to G4 via gate G6 and via output $e$ and in further succession the registrations of all counters Z1 to Z4 are reset. Moreover, the signal transmitted from the output of gate G6 is supplied as a clock signal to inputs $b$ of switching stages E1, so that stage E1 is changed from its 0-state to its 1-state, and stage E3 is changed from its 1-state to its 0-state. A 0-signal is now transmitted via output E1$e$, so that block clock signal TB1 is disabled. However, a 1-signal is transmitted via output E3*e* to the AND gate, so that block clock signal TB3 is transmitted as the block clock signal via gate G5 and via output c which identifies the block position which is now correct.

When two of the switching stages E1 to E4 assume the 0-state, 1-signals are transmitted from the outputs of gates N5, N6, N7. N8, U6, G6, which cause a resetting of switching stages E1 to E4 into the 1-state.

Figure 5:
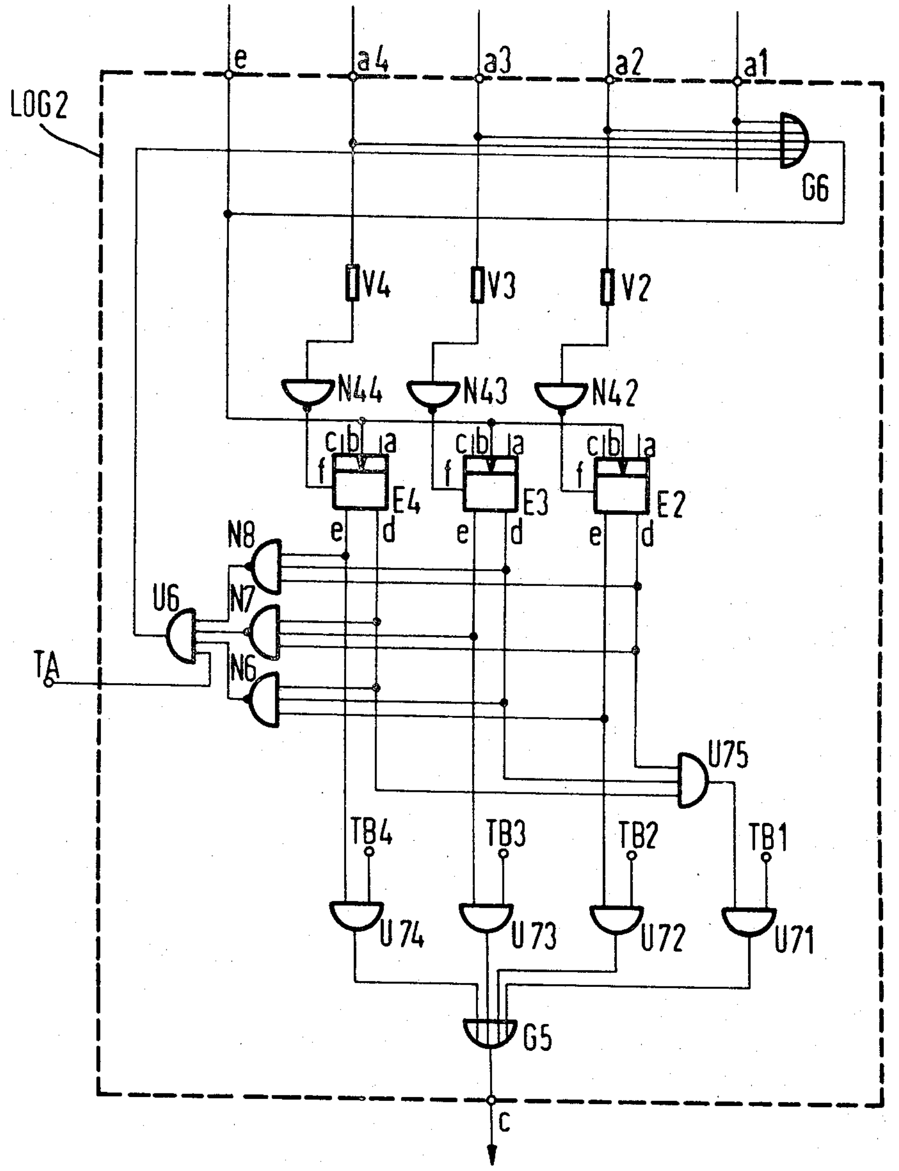

FIG. 5 illustrates logic circuit LOG2 which can likewise be utilized as the logic circuit LOG shown in FIG. 1. In this circuit arrangement the outputs d of switching stages E2, E3, E4, are connected to AND gate U75. Thus, as long as these switching stages E2, E3, and E4 are in the 1-state, wherein they transmit a 1-signal via output *d*, gates U71, U75 remain opened, and block clock signal TB1 is transmitted as the block clock signal via gate G5 and via output *c* which identifies the correct block position. Using this arrangement, switching stage E1 is not needed.

Figure 6:
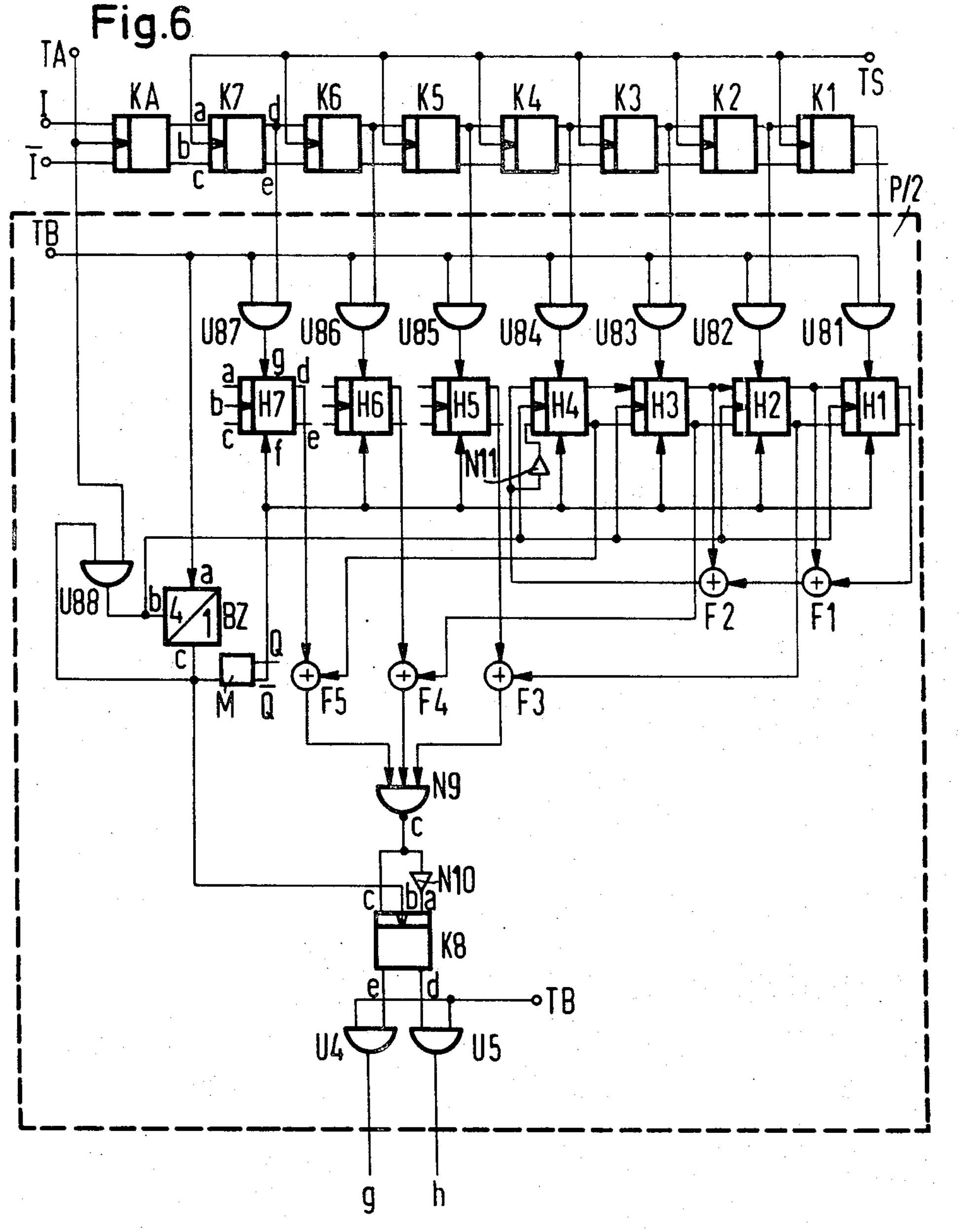
FIG. 6 is a schematic diagram of a further testing circuit which can be used in the circuit arrangement shown in FIG. 1.

The circuit arrangement shown in FIG. 6 illustrates an additional testing circuit P/2, which could, alternatively be used for testing circuit P1-4. It is assumed that a data-block is made up of seven bits. The first four bits A1 to A4 of this data block are information bits, whereas the other bits A5 to A7 are parity bits which also serve to synchronize. Each of the switching stages K1 to K7 is allocated to each bit of the data block. These switching stages K1 to K7 and switching stage KA are operated in the same manner as the switching stages K1 to K4 shown in FIG. 1. The received data are thus stored in the shift register, which is made up of switching stages K1 to K7.

The testing circuit P/2 comprises AND gates U81, U82, U83, U84, U85, U86, U87, U88, U4, U5, bistable switching stages H1 to H7, binary adders F1, F2, F3, F4, F5, counter BZ, monostable switching stage M, NAND gate N9, bistable switching stage K8 and NOT gates N10, N11.

Bistable switching stages H1 to H7 have inputs *a*, *b*, *c*, *f*, and *g* and outputs *d* and *e*. For reasons of simplicity, these inputs and outputs are only marked at switching stage H7. These switching stages H1 to H7 assume the 0-stage, when they transmit a 0-signal via output *d* and a 1-signal via output *e*. They assume the 1-stage when they transmit a 1-signal via output *d* and a 0-signal via output *e*. A transfer from the 0-stage to the 1-stage takes place when, with $a=1$, $c=0$, $f=1$, $g=1$, at input *b*, a signal transition from 1 to 0 takes place. Moreover, a transition from the 0-state to the 1-state occurs when a 0-signal appears at input *g* and a 1-signal appears at input *f*. Finally, a change from the 0-state to the 1-state takes place when, with $a=1$, $c=1$, $f=1$, $g=1$, at input *b*, a signal transition takes place from a 1-value to a 0-value.

A transfer from the 1-state to the 0-state takes place when, with $a=1$, $c=1$, $f=1$ at input *b*, a signal change from a 1-value to a 0-value occurs. Starting from a 1-state, the 0-state is also assumed when a 1-signal appears at input *g*, and a 1-signal appears at input *f*. Finally, starting from a 1-state, the 0-state is assumed when, with $a=0$, $c=1$, $f=1$, $g=1$, at input *b*, a signal transition from a 1-value to a 0-value takes place.

Adders F1 to F5 operate in the same manner as the adder F shown in FIG. 1.

The received data are serially supplied to switching stages K7 to K1. From the outputs of these switching stages the individual bits are supplied to switching stages H7 to H1 via AND gates U87 to U81. This transfer of the individual bits takes place at instants determined by block clock signal TB. Switching stages H4, H3, H2, H1, are allocated to the information bits. In response to these information bits, and by utilizing adders F2 and F1, the parity bits which must be stored in switching stages H7, H6, H5 are determined, if a code word is present and the data were read out from switching stages K7 to K1 with the correct block position. A code word and the correct block position are present when 1-signals are transmitted from the outputs of all the adder stages F5, F4, F3. In this case, in further succession a 0-signal is transmitted from the output of NAND gate N9, and a 1-signal from output *d* of sweep stage K8, so that a 1-signal is transmitted to the connected counters via line *h* with each block clock signal TB.

If a -0-signal is transmitted via the output of at least one of adders F5, F4, F3, a 1-signal is transmitted to switching stage K8 via the output of NAND gate N9, so that in further succession a 1-signal is transmitted to AND gate U4 via output *e* of this sweep stage K8. With the next block clock signal TB a 1-signal is transmitted via line *g*, and the connected counter is reset.

By utilizing counter BZ and AND gate U88, clock signals are derived for the operation of switching stages H1 to H4 and K8. Counter BZ is switched in when a block clock signal TB comes in via input a. From this instant a 1-signal is transmitted via output *c*, and, moreover, from this instant the signals supplied via input *b* are counted. When counter position four is reached, the signal transmitted via output *c* of counter BZ again assumes the 0-value. With the negative pulse slope occurring in the process, monostable switching stage M is initiated, and a signal is transmitted to inputs *f* of switching stages H1 to H7 via the output thereof.

A counter is allocated to each testing circuit P/2. Each input of these counters is connected to line *h*, and each additional input is connected to the corresponding line g of the allocated testing circuit. The outputs of these counters, as shown in FIG. 1, are connected to a logic circuit LOG which can be constructed as the logic circuits LOG1 or LOG2 shown in FIG. 4 or 5.

Since seven testing circuits P/2 are provided, corresponding to the seven switching stages K1 to K7, also seven inputs *a*1 to *a*7 are provided to logic circuits LOG, LOG1, LOG2. If, particularly, a logic circuit is provided similar to logic circuit LOG1, then seven switching stages E1 to E7 are provided. If a logic circuit is utilized similar to logic circuit LOG2, then only six stages corresponding to stages E2 to E7 are provided.

Figure 7:
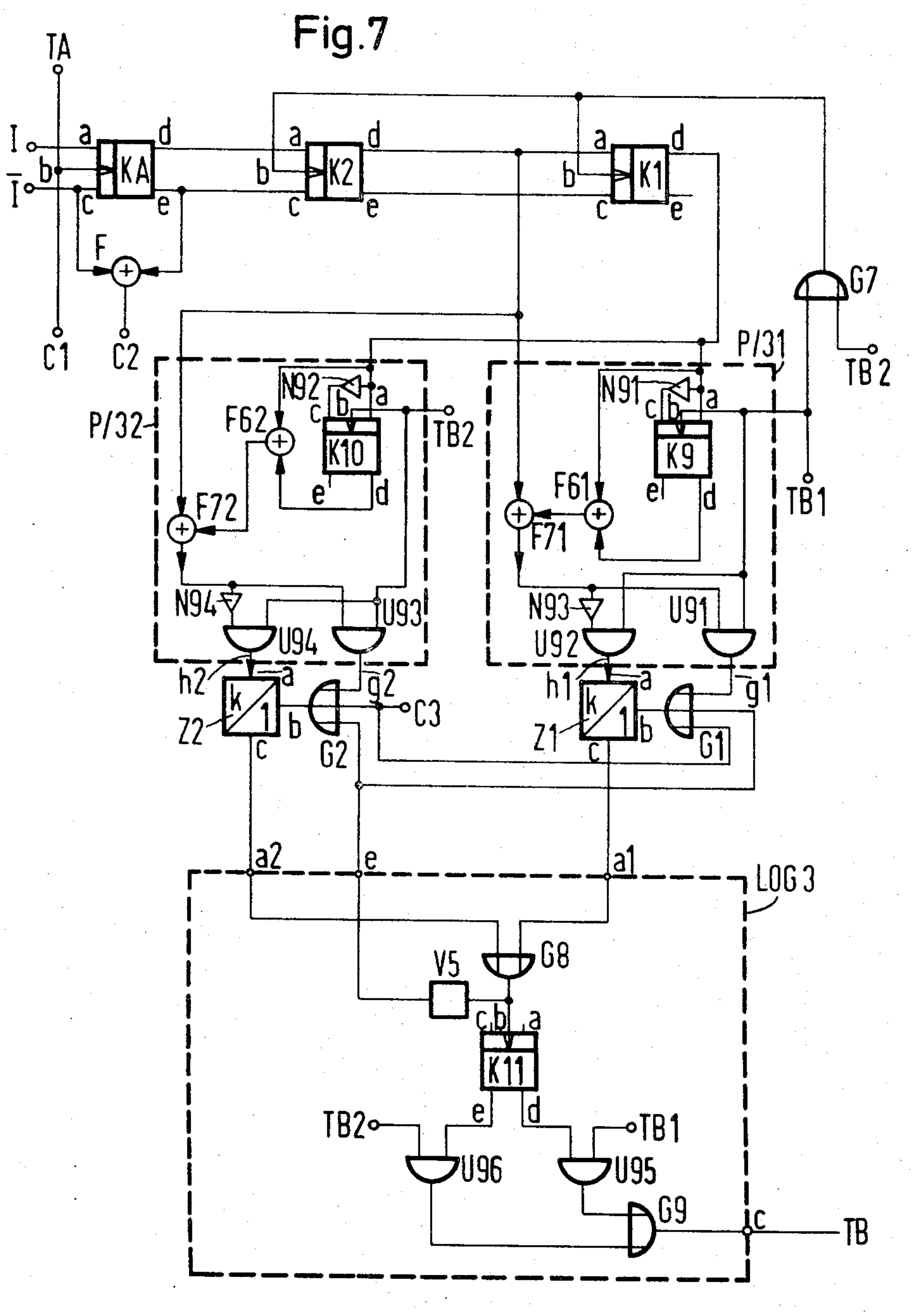
FIG. 7 is a schematic diagram of an alternative circuit arrangement for receiving data blocks wherein two testing circuits are provided.

FIG. 7 illustrates an alternative circuit arrangement for receiving data blocks, wherein only two testing circuits P/32 and P/31 are provided. Counters Z2 or Z1 and logic circuit LOG3 are connected to these two testing circuits. In the circuit arrangement shown in FIG. 7, it is assumed that each of the individual data blocks consists of only of two bits which are stored into switching stages K2 and K1. A plurality of data blocks are allocated to each character to be transferred. The individual bits of the received message are supplied in like manner as in the circuit arrangement shown in FIG. 1, via terminal I or terminal $\bar{I}$, to input *a* or *c* of switching stage KA, to whose outputs is connected the shift register which, in the present case, is only made up of the two switching stages K2 and K1. The pulses of block clock signals TB1, TB2 are supplied to switching stages K2 and K1 via gate G7. It is further assumed that alternately an information bit I0, I1, I2, I3, I4 and alternately each of the parity bits R0, R1, R2, R3 is transferred. Thus, at terminals I the bits are received in the following form: I0, R0, I1, R1, I2, R2, I3, I4, R4. In so doing, the parity bits R are dependent on a plurality of information bits I0, I1, I2, as this is known in accordance with convolutional codes. For reasons of simplicity, it is assumed in the present embodiment that a specific parity bit is dependent on the binary sum of the two information bits immediately preceding. For example, parity bit R2 is dependent on the binary sum of the two information bits I2 and I1. Parity bit R3 is dependent on the binary sum of information bits I3 and I2. It is possible that the parity bits are dependent on a substantially larger number of information bits.

In testing circuits P/32 and P/31, it is determined whether a code is present, a 1-signal is transmitted via outputs h2 or *h*1. When testing circuits P/32 and P/31 determine that no code word is present, a 1-signal is transmitted via outputs *g*2 or *g*1, through which counters Z2 or Z1 are reset via gates G2 or G1. Each of these testing circuits P/32 or P/31 comprises a switching stage K10 or K9 which is operated as the switching stages K4 to K1 shown in FIG. 1. Furthermore, binary adders F61, F71, F62, F72, AND gates U91, U92, U93, U94, and NOT gates N93 and N94 are provided.

In the circuit arrangement shown in FIG. 1, the output of binary adder F is connected to switching point C3 via NOT gate N1, AND gates U1, U2 and counter AZ. In the circuit arrangement shown in FIG. 7, the output of adder F is similarly connected to the components mentioned which, however, are not illustrated.

Logic circuit LOG3 comprises OR gates G8, G9, delay element V5, switching stage K11, and AND gates U95 and U96. The block clock signal is transmitted via output *c* of logic circuit LOG3, which identifies the correct block position.

The circuit arrangement shown in FIG. 7 and the principle underlying the same is unique and advantageous in that only small expenditure is required for only two testing circuits and only two counters.

Although certain preferred embodiments of the invention have been disclosed for purposes of illustration, it will be evident that various changes and modifications may be made therein without departing from the scope and spirit of the invention, as defined by the appended claims.

I claim:

1. A circuit arrangement for synchronizing transmitters and receivers in a data transmission system for accurately transmitting blocks of data, said blocks being constituted by information bits and parity bits, said bits, upon reception, being entered serially into a shift register, comprising:

a plurality of testing circuit means for supplying a testing clock signal and for thereafter producing a testing signal when bits are stored in said shift register which pertain to the same data block, said testing circuits being individually connected to different ones of the stages of said shift register, said testing circuits each including means for generating said testing signal responsive to information bits and parity bits, clock generator means for generating as many clock signals as there are bits in said data blocks, means for coupling said clock signals to said testing circuits, counter means having inputs connected to outputs of said testing circuits and logic circuit means connected to outputs from said counter for determining the correct block clock signal in relation to the output signals of said counter.

2. The circuit arrangement defined in claim 1 wherein as many as said testing circuits are provided as different block positions of said data blocks are possible, each said block clock signal being supplied to each said testing circuit, and wherein outputs of said testing circuits are connected to said counter means, said circuit arrangement additionally comprising second outputs of said testing circuits connected to reset inputs of said counter means.

3. The circuit arrangement defined in claim 1 wherein the outputs of said counter means are connected to reset inputs of said counter means over an OR gate.

4. The circuit arrangement defined in claim 1 additionally comprising:

bistable switching means to which the bits of said data blocks are supplied and which is connected to said shift register over an output, binary adder means having an input connected to an input of said bistable switching means and having a second input connected to an output of said bistable switching means, additional counter means constructed to have its registration increased by one unit when a counting signal appears at a first input, the additional counter means registration means being reset when a resetting signal appears at a second input, said additional counter means being constructed further to transmit a counting signal over an output when a predetermined registration is reached, first gate means having inputs connected to said clock generator and to said adder, said output of said first gate being connected to said second input of said additional counter means, inverter means and second gate means having an input connected to the output of said adder over the said inverter means, said clock generator being connected to a second input of said second gate, the output of said second gate being connected to the first input of said additional counter means, and the output of said additional counter means being connected to the reset inputs of said counter means.

5. The circuit arrangement defined in claim 4 wherein a predetermined final position of registration of said additional counter means is lower in value than a predetermined final position of registration of said counter means.

6. The circuit arrangement defined in claim 1 further comprising:

first OR gate means, bistable switching means connected to outputs of said counter means, and additional input of said bistable switching means being connected to an output of said OR gate, AND gate means connected to outputs of said bistable switching means, each said block clock signal being supplied to each additional input of said AND gates, second OR gate means, outputs of said AND gates being connected to inputs of said second OR gate, and means connecting an output of said second OR gate to the output of said logic circuits.

* * * * *